Patented Jan. 17, 1933

1,894,666

UNITED STATES PATENT OFFICE

WALTER G. CHRISTIANSEN, OF BLOOMFIELD, NEW JERSEY, AND ALFRED E. JURIST, OF BROOKLYN, NEW YORK, ASSIGNORS TO E. R. SQUIBB & SONS, OF NEW YORK, N. Y., A CORPORATION OF NEW YORK

AMIDOPYRIN BORATE IN COMBINATION WITH ACETONE AND PREPARATION THEREOF

No Drawing.   Application filed October 10, 1929.   Serial No. 398,810.

Our invention relates to amidopyrin borate in combination with acetone and to the preparation thereof.

We have found that amidopyrin borate in combination with acetone can be prepared by causing pyramidon and boric acid, preferably in the respective approximate proportions of 1 and 5 molecules, to interact in acetone preferably heated; and that this composition is considerably superior to amidopyrin in therapeutic activity.

As an example of the process of our invention, we may dissolve 33 grams of boric acid in 3 liters of boiling acetone and add 25 grams of amidopyrin dissolved in 100 cubic centimeters of acetone. Then the mixture is evaporated to one-fifth of its original volume and allowed to cool. There crystallizes out a white compound, which may be collected on a Buechner's funnel, washed with acetone, and dried in the air. This composition is stable in air and readily soluble in water; and its solubility in acetone is intermediate between those of amidopyrin and boric acid. Analysis shows it to be constituted of amidopyrin, boric acid, and acetone, in the respective approximate proportions of 1, 5, and 1 molecules.

It will be understood that the foregoing example does not delimit, but merely illustrates, our invention, which may be variously otherwise embodied within the scope of the appended claims.

We claim:

1. A compound consisting of amidopyrin, boric acid, and acetone, in the respective approximate proportions of 1, 5, and 1 molecules.

2. The process which comprises causing amidopyrin and boric acid, in the respective approximate proportions of 1 and 5 molecules, to interact in acetone.

3. The process which comprises causing amidopyrin and boric acid, in the respective approximate proportions of 1 and 5 molecules, to interact in heated acetone.

4. The process which comprises mixing a hot acetone solution of boric acid with an acetone solution of amidopyrin, the respective approximate proportions of the amidopyrin and boric acid being 1 and 5 molecules, evaporating the major part of the acetone, allowing the mixture to cool, and separating from the liquid the crystals formed.

In testimony whereof we affix our signatures.

WALTER G. CHRISTIANSEN.
ALFRED E. JURIST.